United States Patent [19]

Raguse

[11] 3,853,598
[45] Dec. 10, 1974

[54] ADHESIVE TAPE
[75] Inventor: Roger C. Raguse, La Porte, Ind.
[73] Assignee: Scholl, Inc., Chicago, Ill.
[22] Filed: Feb. 9, 1972
[21] Appl. No.: 224,920

Related U.S. Application Data
[63] Continuation of Ser. No. 29,566, April 17, 1970, abandoned.

[52] U.S. Cl. ........... 117/76 A, 117/122 P, 128/156, 161/88, 161/91, 161/167
[51] Int. Cl. .............................................. C09j 7/04
[58] Field of Search .... 117/122 P, 122 PB, 122 PA, 117/76 A; 161/88, 91, 167; 128/156

[56] References Cited
UNITED STATES PATENTS

| 2,266,631 | 12/1941 | Francis | 161/91 |
| 2,482,164 | 9/1949 | Finlayson et al. | 161/91 X |
| 2,487,060 | 11/1949 | Pike et al. | 117/122 X |
| 2,508,855 | 5/1950 | Brown | 117/122 X |
| 2,740,403 | 4/1956 | Schueler | 128/156 |
| 2,828,776 | 4/1958 | Meyer | 139/420 |
| 3,036,602 | 5/1962 | Meyer et al. | 139/420 X |
| 3,052,237 | 9/1962 | Chand | 128/156 |
| 3,068,117 | 12/1962 | Korpman | 117/76 |
| 3,121,021 | 2/1964 | Copeland | 128/156 X |
| 3,239,478 | 3/1966 | Harlan | 260/27 |
| 3,451,537 | 6/1969 | Freeman et al. | 260/845 X |
| 3,502,497 | 3/1970 | Crocker | 117/76 X |
| 3,534,965 | 10/1970 | Harrison et al. | 260/878 X |

FOREIGN PATENTS OR APPLICATIONS

| 950,998 | 3/1964 | Great Britain | 117/76 UX |

Primary Examiner—William D. Martin
Assistant Examiner—Bernard D. Pianalto

[57] ABSTRACT

This invention or discovery relates to a pressure-sensitive adhesive tape, highly desirable for surgical usage, among others, and which can extremely easily be torn in either direction with the fingers cleanly and straight, leaving smooth, even edges unfrayed and devoid of dangling fibers.

10 Claims, 4 Drawing Figures

PATENTED DEC 10 1974          3,853,598

INVENTOR
ROGER C. RAGUSE

ATTORNEYS

ADHESIVE TAPE

CROSS REFERENCE TO RELATED APPLICATIONS

The instant application is a continuation of my pending application entitled "ADHESIVE TAPE," filed Apr. 17, 1970, Ser. No. 29,566, and now abandoned.

The adhesive mass, given by way of example in this application, is more fully described and claimed in my co-pending application entitled "Pressure-Sensitive Adhesive Mass," filed Mar. 30, 1970, Ser. No. 24,003, U.S. Pat. No. 3,660,323.

SUMMARY OF THE INVENTION

Heretofore, a porous adhesive tape having a rayon backing with an acrylate adhesive mass spread over one face thereof has been provided. At spaced intervals the adhesive is pressed into the backing and at those spaced intervals the adhesive bonds adjacent threads of the backing together. By virtue of such bonding it is alleged that the rayon fabric so bonded at spaced intervals is much easier to tear than fabric backings to which the adhesive is not bonded in such a manner. The tearing, however, is only crosswise of the adhesive strip, and even so usually results in rough edges at the line of tear and with a long dangling fiber at the end of the tear line, and even in that one direction tearing by hand requires more strength than is desired. This tape has been known to become rather gluey and sticky in the summer time, and frequently leaves some adhesive mass on the skin of a patient after removal of the tape, especially after the tape has been wetted.

Also, heretofore, cotton fabric has most commonly been used as the backing for adhesive tape, especially that used in hospitals and doctors' offices. Cotton tape can only be torn with the exercise of an objectionable amount of strength, and even then not as cleanly as desired. A normal tearing for a tape having cotton fabric backing tends to cause the tape to curl and stretch at the point of tear, thus leaving the tape highly irritating to the attending physician or surgeon to apply to the patient's body. On cotton fabric-backed tape, a rather large amount of adhesive mass must be utilized owing to fiber pick-off when the tape is rolled.

The instant invention relates to a pressure-sensitive adhesive tape for general purpose surgical uses in hospitals, clinics, physicians' and surgeon' offices, and by individuals. The tape is easily torn by hand in either direction, crosswise or longitudinally, using less strength than with any fabric-backed tape heretofore made. The edges resulting from the tearing are clean, unfrayed and there are no objectionable dangling fibers remaining to irritate the user. The tape also requires less pressure-sensitive adhesive mass than tapes utilized heretofore, especially because no tackiness is lost by virtue of rolling the tape. The tape may be easily removed from the skin of a patient or user and leaves no adhesive mass deposit upon the skin after removal of the tape, even though the tape has previously been wetted. With the use of the instant invention, it is not necessary for a hospital, a doctor's office, and the like, to stock a supply of adhesive tapes over a wide range of widths, because the tape embodied in this invention may readily be torn lengthwise into strips of a desired width, and each strip so removed from a stock piece of tape will be of even width throughout its length. The tape may also equally as readily be torn crosswise to determine the desired length for a particular usage. For example, a tape one inch wide may readily be torn lengthwise into two strips one-half inch wide or into four strips one-quarter inch wide each. More specifically, the instant tape comprises a woven synthetic fiber backing coated on one side with a primer which uniformly bonds or unifies the threads of the backing together into a single uninterrupted sheet which may be exceptionally easily torn in either direction, straight, accurately, and cleanly. The adhesive mass is calendered to the primed side of the backing, which heretofore has not been satisfactorily accomplished, especially with a rayon acetate backing. The adhesive mass may be utilized without the danger of delamination even though the backing has been wetted. Further, the adhesive does not enter into the backing but directly contacts only the primer. Therefore, the tape may be economically manufactured since less adhesive mass is required than with tapes known heretofore where some of the adhesive enters or is forced into the backing. It may further be noted that primed synthetic fiber backing, such as rayon acetate, for example, accepts calender applied adhesive without the need of any solvent spread.

In addition, the instant invention is odorless because of the primer used, waterproof to the extent that water does not reach the adhesive through the primer even though the backing is wetted, and provides excellent adherence to the backing when one layer of tape crosses over a previously applied layer in forming a bandage.

Other objects, features and advantages of the invention will be readily apparent from the following description of a certain preferred embodiment thereof, taken in conjunction with the accompanying drawing, although variations and modifications may be effected without departing from the spirit and scope of the novel concepts of the disclosure.

DETAILED DESCRIPTION

Figure 1:
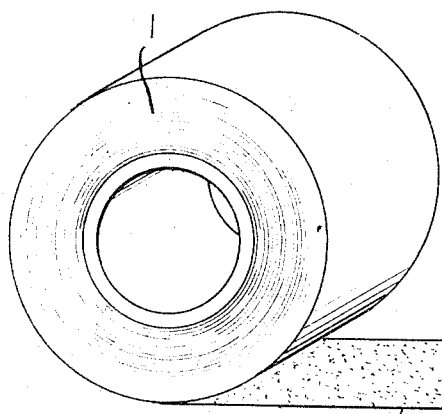
FIG. 1 is a fragmentary perspective view of a roll of adhesive tape embodying the principles of the instant invention, showing the same partially unwound and partially torn in both directions to illustrate the cleanness of the tearing.
Figure 1:
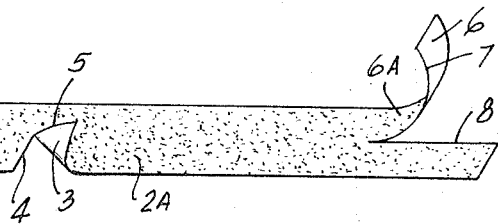

To indicate an important advantage of the instant invention, in FIG. 1 of the drawing there is shown a roll of adhesive tape 1 made in accordance with the instant invention and from which a strip 2 has been unrolled. This tape may be easily torn in either direction with very small exertion on the part of the operator, and utilizing only the fingers and thumbs of the hands. To indicate the nature of the tear, the tape is shown partially torn across to separate from the strip 2 a desired length of adhesive tape, as indicated by the raised flap 3. It will be noted that the edge 4 remaining on the strip 2 is clean and free from any fraying, and the same is true with the edge 5 on the removed portion of the strip 2, both these edges extending straight across the tape at right angles to the side edges of the strip 2. It will be noted that the tear is clean, easily accomplished, and there is no stretching or curling of either the strip 2 or the piece 2a being torn therefrom at the point of tear, as would be the case if a cotton cloth backing was used in the tape. The tape may easily be torn lengthwise thereof as indicated by the elevated flap 6 to acquire a strip 6a of tape of less width than the strip 2. The lengthwise tear requires no more strength on the part of the operator than the cross tear above discussed, and it will be noted that the side edge 7 on the narrow strip 6a and the side edge 8 on the remainder of the strip 2 are both clean, and free of any fraying or dangling threads. It will also be noted that the strip 6a being removed will be of even width throughout its length and this is the case whether the tear is made rapidly or slowly, the line of tear remaining straight at all times, especially if the strip is torn directly from the roll, with only the strip being unrolled. Slower tearing is preferred if an unrolled strip is torn lengthwise owing to the tendency of the arm to move inwardly across the body when rapidly downwardly and thus exert a transverse force.

Figure 2:
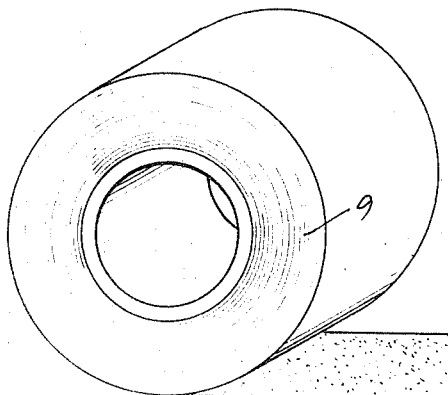
FIG. 2 is a view similar to FIG. 1 but illustrating what occurs in tearing tape of the prior art.
Figure 2:
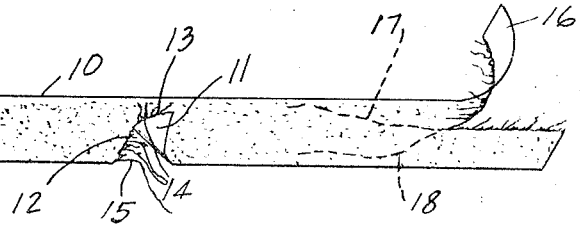

In contrast to the tape of FIG. 1, FIG. 2 discloses adhesive tape of the surgical type known heretofore. In FIG. 2 there is shown a roll of surgical adhesive tape 9 from which a strip 10 has been unrolled. The tape 9 comprises a sheet of backing material upon which a pressure-sensitive adhesive spread has been placed directly against the backing material. An attempt to tear the tape transversely as indicated by the elevated flap 11 requires considerable strength and the remaining edge on the strip 10 and the edge of the piece being removed therefrom, as indicated at 12 and 13 respectively, are both rough and each most frequently will carry some dangling threads or frayed fibers as indicated at 14. If the backing of the tape 9 was a woven cotton backing, tearing of the tape crosswise was not at all satisfactory because of the strength required to accomplish it, and there would be many such frayed fibers or dangling sections of thread extending therefrom, as well as the side edges of the tape being curled and stretched at the point of tear. If the backing were of synthetic fibers and the tape pressed into the backing at spaced points to unite the fibers at spaced points, there most frequently would be some tiny frayed fibers extending intermediately of the torn edges, and quite likely a dangling piece of thread as indicated at 15 at the end of the tear line, even though such tape required less strength to tear than a tape having a woven cotton backing. As indicated by the elevated flap 16, the same results occur if an endeavor is made to tear the tape longitudinally, assuming that sufficient strength is used. However, with the tape 9, most frequently if the tape is torn longitudinally there will be a deviation from a straight line tear as indicated by the dotted lines 17 and 18 and it is virtually impossible to tear the tape in a straight line, regardless of what backing material it has, even one-fourth of the time. Thus, surgical adhesive tape heretofore known could not be torn, insofar as I know, longitudinally so as to make it fit for use in hospitals and doctors' offices.

Figure 3:
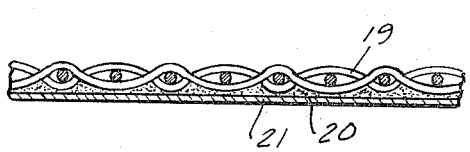
FIG. 3 is a greatly enlarged vertical sectional view of the tape of FIG. 1 indicating the structure thereof.
Figure 4:
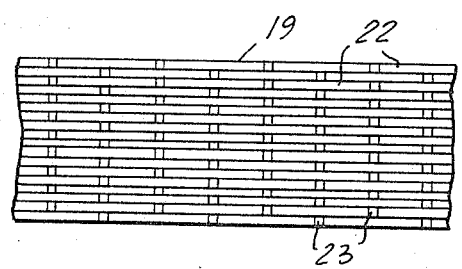
FIG. 4 is a greatly enlarged or magnified plan view diagrammatically indicating the arrangement of the threads woven to produce the fabric backing for the tape.

FIGS. 3 and 4 are magnified showings, somewhat diagrammatic, illustrating the construction of the adhesive tape of FIG. 1. The tape embodies a woven fabric backing 19 having a high thread count. Over one face of this backing, which may be either face, is a coating of a primer 20 which fully covers the face of the backing to which it is applied. On the exposed face of the primer 20 is a layer of pressure-sensitive adhesive for attaching the tape to the body of a patient. The adhesive 21 contacts only the surface of the primer and does not contact or enter into the backing 19. Consequently, a lesser quantity of adhesive may be used than has been heretofore customary. For example, in comparison with a woven cotten backing to which adhesive is directly applied, 30 to 40 percent less adhesive may be utilized successfully with the instant invention because none of the adhesive enters into the backing and there is no fiber pick-off when the adhesive tape is rolled and unrolled.

With reference to FIG. 4, it will be seen that all the warp threads 22 are parallel to each other and all the weft threads 23 are parallel to each other, there preferably being several times as many warp threads as weft threads. The primer 20 bonds all these threads together producing, in effect, a single sheet of material which may easily and cleanly be torn straight in either direction.

Various types of synthetic fiber fabric may be utilized, particularly cellulosic synthetic fiber fabric, including cellulose acetate, rayon, rayon acetate, among others. Various types of primer may be utilized, an acrylic latex primer being preferred. An acrylic water-based primer has been utilized with moderate success, but a water-based primer has a tendency to permit water penetration to the adhesive mass and thus in a number of cases causes delamination. Consequently, an acrylic solvent-based primer is much preferred, because it extremely effectively prevents water and soap passing through the backing to the adhesive. Such primers are sold by The B. F. Goodrich Company denoted as its 2600X series for the water-based primer and as its 2100X series of acrylic solution polymers, based in solvent such as methyl ethyl ketone and n-heptane. Such a primer does not objectionably stiffen the backing. Also, various types of adhesive mass may be calendered onto the primer including the conventional rubber-based adhesive mass which heretofore has been limited to solvent spreading instead of calendering.

In this regard a rayon acetate backing is so smooth that it will not pull an adhesive spread off the middle calender roll. But the instant primer effectively solves that problem.

By way of example, at present the preferred form of tape embodying this invention comprises a rayon acetate fabric backing having a thread count in the neighborhood of 180 warp threads and 54 weft threads per square inch. To this backing, over one face thereof, a primer was doctored to a thickness of approximately 0.0005 inch. This primer is designated by The B. F. Goodrich Chemical Company as "Hycar 2100X22" prepared in n-heptane as a solvent. This primer has average properties in the neighborhood of solids-45%, Brookfield Viscosity-2,200 cps., Williams Plasticity-2.7 mm., tack under a probe test of 2,500 grams per square centimeter, and a specific gravity when wet of 0.83. The primer bonded the threads of the fabric uniformly throughout into virtually a solid sheet of backing material.

Also, by way of example, a synthetic and natural rubber-based adhesive mass, such as is set forth and claimed in my aforesaid co-pending application, has proven highly satisfactory for the instant adhesive tape. That adhesive mass is made by first forming an internally mixed batch and secondly using that batch with other ingredients to constitute a mill batch which is applied to the primed tape backing. The internally mixed batch, in parts by weight, contained approximately 61 parts of synthetic isoprene rubber, 26 parts of styrene-polyisoprene-styrene block copolymer, 28 parts of pale crepe natural rubber, 95 parts of zinc oxide, 24 parts of starch, 5 parts of lanolin, and 1 part of antioxidant. The mill batch contained approximately the total internally mixed batch of 240 parts, 55 parts of ester resin, and 55 parts of a wood resin derivative. The synthetic rubbers provided excellent adhesion to the skin, and the natural rubber provided excellent adhesion to the outer face of the backing when one layer of tape overlaps an applied layer in the forming of a bandage. The primer provided an excellent barrier, preventing the adhesive from entering the fabric, the adhesive only being in contact with the primer when applied to the tape.

The fact that the primer bonds the threads of the backing uniformly throughout causes a tearing stress to be concentrated at the point of tear, thereby making the finished tape easier to accomplish and the tear even and clean with no stretching of the tape and with no projecting frayed fibers. Under a series of tests, the average force needed was approximately nine ounces to tear the tape either crosswise or lengthwise, either tear being straight and the edges adjacent the tear being flat. The primer also affords an excellent bond between the adhesive and fabric backing so that there is no delamination of the tape. Further, the primer is quite insensitive, to wetting of the tape. Under tests, the tape was wound around the fingers, and the hands washed in hot water before removing the tape. Upon removal of the tape there was no sticky feeling on the hands, and there was no trace of adhesive mass adhering to the skin. This adhesive tape was also tested to ascertain its ability to withstand body temperature. Samples of the tape were placed upon thermosetting plastic panels, such as a phenolic condensation product, and incubated for one hour at 38°C. The tape was then immediately peeled, slowly, and there was no trace of any adhesive mass remaining on the panels.

It is therefore apparent that the primer of this invention is multi-functional. The single primer coating prevents water, soap and the like passing through the backing from reaching the adhesive; it presents the adhesive from reaching the backing itself; it bonds the threads of the backing uniformly throughout; and the primer, being compatible with the adhesive, provides an effective anchor coat for the adhesive preventing delamination and permitting calendering of the adhesive directly to the primer.

The tape of the instant invention, therefore, is a smooth surfaced fabric backed adhesive tape which may be torn straight in either direction under a pressure or force of less magnitude than was heretofore possible. The tape is resistant both to moisture and temperature and may be removed from the skin of a patient without leaving a sticky feeling or trace of adhesive mass behind. The tape may easily be cleansed when in use with a damp rag. Further, the tape is economical to manufacture, especially in view of the facts that the adhesive mass may be calendered onto the primed backing and less adhesive mass is necessary because the adhesive does not enter the fabric backing. In addition, it should be noted that while the instant tape is easily torn, tests have shown that the tape still retains its tensile strength which is substantially equal to that of conventional surgical tapes.

I claim as my invention:

1. A non-porous pressure-sensitive adhesive tape for general and surgical uses, consisting of the mechanical combination of:
    a closely woven synthetic fiber fabric backing having a smooth surface and having a number of warp threads parallel to each other and perpendicular to a lesser number of weft threads also parallel to each other;
    a primer on one face of said backing bonding the fibers of said backing together throughout and providing the effect of a solid impervious sheet;
    a pressure-sensitive adhesive layer directly on and carried by the inner face of said primer sufficiently positively to prevent delamination when said tape is in use;
    the tape being physically characterized by its capability of being torn by hand with a force from start of the tear to the end of the tear of less than one pound either transversely or longitudinally of the tape, resulting in a straight line tear leaving clean and smooth unfrayed edges free from stretching or curling, and regardles of where the tear is started at any side or end edge of the tape; and
    said backing being woven of rayon acetate threads, the thread count being in the neighborhood of 180 warp threads and 54 weft threads per square inch.

2. A non-porous pressure-sensitive adhesive tape for general and surgical uses, consisting of the mechanical combination of:
    a closely woven synthetic fiber fabric backing having a smooth surface and having a number of warp threads parallel to each other and perpendicular to a lesser number of weft threads also parallel to each other;
    a primer on one face of said backing bonding the fibers of said backing together throughout and providing the effect of a solid impervious sheet;
    a pressure-sensitive adhesive layer directly on and carried by the inner face of said primer sufficiently positively to prevent delamination when said tape is in use;
    the tape being physically characterized by its capability of being torn by hand with a force from start of the tear to the end of the tear of less than one pound either transversely or longitudinally of the tape, resulting in a straight line tear leaving clean and smooth unfrayed edges free from stretching or curling, and regardless of where the tear is started at any side or end edge of the tape;
    said primer alone performing the double function of bonding the threads of said backing and acting as a positive anchor coating for said adhesive, the thread count being in the neighborhood of 180 warp threads and 54 weft threads per square inch.

3. A non-porous pressure-sensitive adhesive tape for general and surgical uses, consisting of the mechanical combination of:
   a closely woven synthetic fiber fabric backing having a smooth surface and having a number of warp threads parallel to each other and perpendicular to a lesser number of weft threads also parallel to each other;
   a primer on one face of said backing bonding the fibers of said backing together throughout and providing the effect of a solid impervious sheet;
   a pressure-sensitive adhesive layer directly on and carried by the inner face of said primer sufficiently positively to prevent delamination when said tape is in use; and
   the tape being physically characterized by its capability of being torn by hand with a force from start of the tear to the end of the tear of less than one pound either transversely or longitudinally of the tape, resulting in a straight line tear leaving clean and smooth unfrayed edges free from stretching or curling, and regardless of where the tear is started at any side or end edge of the tape.

4. The adhesive tape of claim 3, wherein said primer is compatible with said adhesive to such an extent that the adhesive may be calendered directly to the face of the primer.

5. The adhesive tape of claim 3, wherein said primer is a solvent-based polymer.

6. The adhesive tape of claim 3, wherein said primer is an acrylic polymer solution prepared in n-heptane as a solvent.

7. A non-porous pressure-sensitive adhesive tape for general and surgical uses, consisting of the mechanical combination of:
   a closely woven sythetic fiber fabric backing having a smooth surface and having a number of warp threads parallel to each other and perpendicular to a lesser number of weft threads also parallel to each other;
   a primer on one face of said backing bonding the fibers of said backing together throughout and providing the effect of a solid impervious sheet;
   a pressure-sensitive adhesive layer directly on and carried by the inner face of said primer sufficiently positively to prevent delamination when said tape is in use;
   the tape being physically characterized by its capability of being torn by hand with a force from start of the tear to the end of the tear of less than one pound either transversely or longitudinally of the tape, resulting in a straight line tear leaving clean and smooth unfrayed edges free from stretching or curling, and regardless of where the tear is started at any side or end edge of the tape; and
   said primer being an acrylic primer which does not objectionably stiffen said backing, and which primer is characterized by having average properties in the neighborhood of solids-45 percent, Brookfield Viscosity-2,200 cps., Williams Plasticity-2.7 mm., tack under a probe test of 2,500 grams per square centimeter, and a specific gravity when wet of 0.83.

8. The adhesive tape of claim 3, wherein said primer prevents moisture applied to said backing from reaching said adhesive and prevents said adhesive from coming into contact with said backing when applied to the underface of said primer.

9. The adhesive tape of claim 3, wherein the primer alone is multi-functional in that it prevents the adhesive from contacting the backing when applied to the primer, prevents water and soap and other moisture passing through the backing from reaching the adhesive, bonds the threads of the backing throughout, and acts as an effective anchor coating for the adhesive preventing delamination and permitting calendering of the adhesive directly to the primer.

10. A non-porous pressure-sensitive adhesive tape for general and surgical uses consisting of a high thread count woven cellulosic snythetic fiber backing in which the warp threads are parallel to each other, the weft threads are parallel to each other and perpendicular to the warp threads, the thread count being in the neighborhood of 180 warp threads and 54 weft threads per square inch, an acrylic polymer primer on one face of said backing, and a pressure-sensitive adhesive layer containing both natural and synthetic rubber applied directly over said primer, the primer fully covering the face of the backing so as to prevent the adhesive layer contacting the backing when applied to the primer and to prevent moisture from passing from the backing to the adhesive, said tape being easily hand tearable in a straight line in both transverse and longitudinal directions leaving clean and smooth unfrayed edges along the tear line.

* * * * *